INVENTOR
ALLISON W. BLANSHINE
CHARLES M. KLINE
CLAUDE K. FOCHT
ROBERT E. WALLIN

BY

ATTORNEY

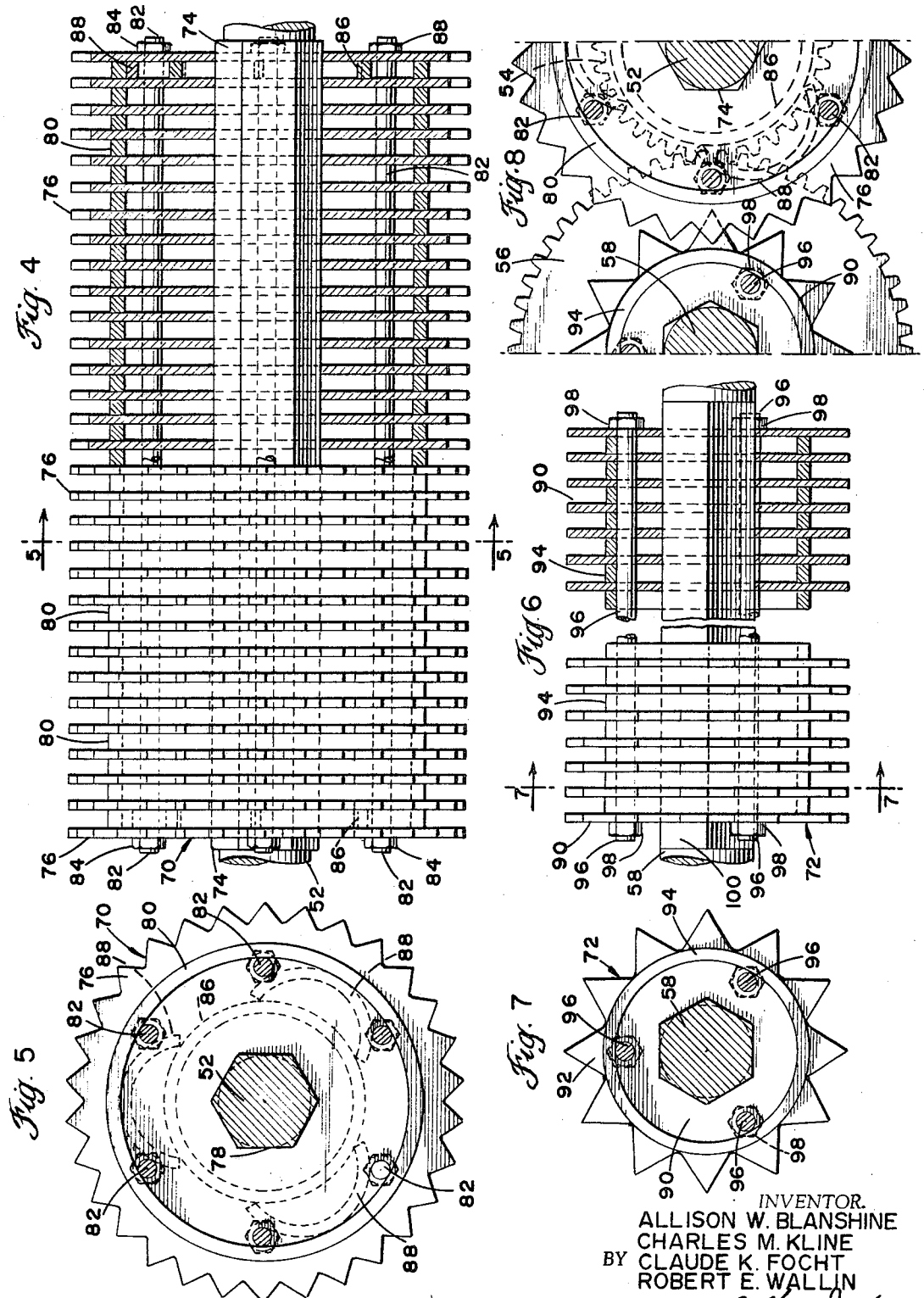

United States Patent Office

3,396,767
Patented Aug. 13, 1968

3,396,767
CORN COB SHREDDING ROLLERS
Allison W. Blanshine, Lititz, Charles M. Kline, Reinholds, and Claude K. Focht and Robert E. Wallin, New Holland, Pa., assignors to Sperry Rand Corporation, New Holland, Pa., a corporation of Delaware
Filed July 19, 1966, Ser. No. 566,306
7 Claims. (Cl. 146—71)

This invention pertains to mechanism for shredding corn cobs and, in particular, comprises suitable means for shredding corn cobs in a process involving the feeding of ears of corn to a processing machine, shelling the corn, cracking the shelled corn kernels, separately chopping and shredding the cobs, and then recombining some or all of the shredded cob material with the cracked corn kernels to comprise suitable feed for cattle and the like.

Essentially, the present invention comprises details of a corn cob shredding unit forming part of an overall type of corn processing machine comprising the subject matter of co-pending application Ser. No. 546,280, filed Apr. 29, 1966, and owned by the same assignee as the instant invention.

In said application, the overall process and machine is described and claimed generally, whereas the purpose of the present application is to describe and claim detailed characteristics of the corn cob shredding rollers illustrated and briefly described in said co-pending application.

Corn cob shredding mechanisms have been developed heretofore for purposes of chopping and grinding corn cobs into relatively small size ranges, some of these shredding mechanisms being intended to prepare the cob material for mixture with shelled corn which has been processed in various ways. Previous cob shredding mechanisms of which the present inventors are aware have not been as efficient as might be possible, especially for purposes of substantially uniformly shredding cobs and, further, permitting the shredding means to be adjusted so as to produce shredded cob products of desired size ranges. Further, certain of these previously designed shredding mechanisms have not been self-cleaning and the designs have been such that, especially under substantial load conditions, damage to the shredding means is possible.

It is the principal purpose of the present invention to provide corn cob shredding means primarily comprising a pair of cooperating rollers respectively provided with circular blades having teeth on the peripheries thereof somewhat resembling saw teeth, and relatively short, cylindrical spacing means are disposed between the blades on each of the rollers radially inward from the peripheral teeth to provide anti-clogging means in addition to accurately spacing the blades in desired axially aligned relationship on each of the rollers.

It is another object of the invention to provide a pair of corn cob shredding rollers of the type referred to above in which the diameter of the blades on one roller is appreciably smaller than the diameter of the blades on other roller, the teeth on the blades of the smaller roller being substantially larger than the teeth on the blades of the roller upon which the blades are of larger diameter, and the shafts of the rollers being parallel and spaced from each other so as to permit the teeth on the blades of one roller to be disposed within the spaces between the teeth on the blades of the other roller, at least in the circumferential portions thereof where the teeth of said blades are interfitted as aforesaid within the spaces between the teeth of the other roller.

A further object of the invention is to provide drive means for the shafts of the rollers and operate the same at such speeds that the roller of the aforementioned type which has the blades of smaller diameter but larger size teeth is driven in an opposite rotary direction with respect to the other roller but at a substantially slower speed, whereby the roller with the smaller diameter blades thereon serves as a metering roller, whereas the other roller serves as a cutting or sawing roller and the arrangement insures orderly, rapid, and effective shredding of corn cobs delivered to the rollers for engagement between the teeth of the respective rollers while being rotatably driven toward each other.

Still another object of the invention is to provide rollers of the aforementioned type with tie-bars extending axially of said rollers and circumferentially spaced around the shafts of the rollers and disposed radially inward from the peripheral teeth of the blades of the rollers and serving to clamp the axially assembled series of blades and spacing rings comprising each roller into a fixed roller unit while simultaneously serving to accurately position the spacing rings between the blades of each roller in concentric relationship with the shafts of each roller.

A still further object of the invention is to provide the cutting of shredding roller which has blades of larger diameter than the metering roller with additional spacing means between the two outermost blades adjacent each end of said roller so that when the tie-bars are tightened into fully clamping relationship, there will be substantially no tendency for the outermost blades to be warped as a result of the said tightening action.

Details of the invention and of the foregoing objects, as well as other objects thereof, are set forth in the following specification and illustrated in the accompanying drawings comprising a part thereof.

In the drawings:

FIG. 3 is a vertical sectional view showing the cob shredding mechanism at the right-hand end of the processing machine shown in FIG. 1, as seen on the line 3—3 of FIG. 1.

FIG. 4 is a fragmentary, partially vertically sectioned elevation of one of the shredding rollers comprising part of the present invention.

FIG. 5 is a vertical sectional view of the shredding rollers shown in FIG. 4 as seen on the line 5—5 of said figure.

FIG. 6 is a fragmentary, foreshortened, partially vertically sectioned view of another shredding roller comprising part of the present invention and cooperable with the shredding rollers shown in FIG. 4.

FIG. 7 is a vertical sectional view of the shredding rollers shown in FIG. 6 as seen on the line 7—7 of said figure.

FIG. 8 is a fragmentary vertical sectional view of the rollers shown respectively in FIGS. 4 and 6 and illustrated in interfitting, operative relationship with respect to each other.

Figure 1:
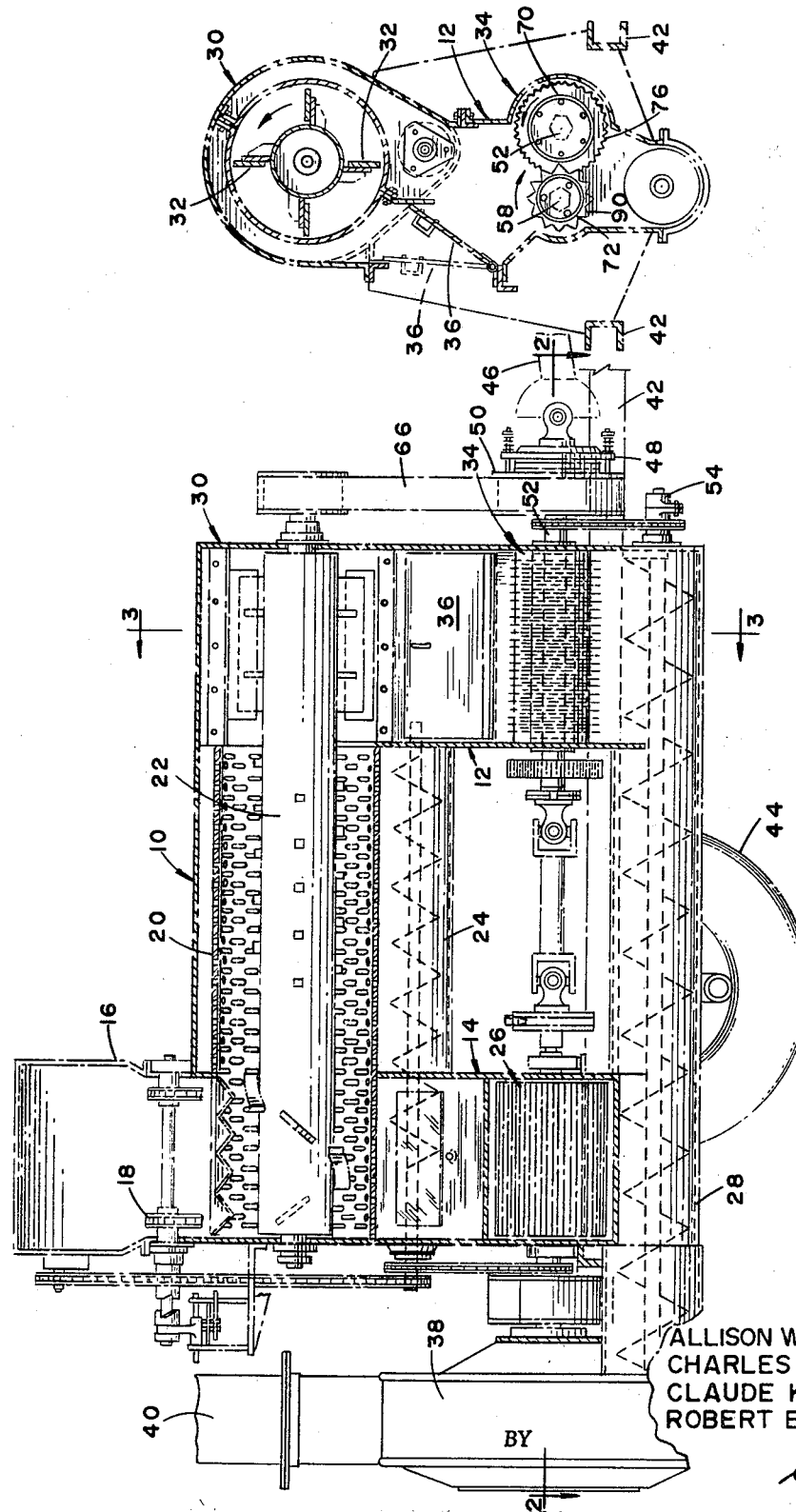
FIG. 1 is a vertical longitudinal sectional view of an overall corn processing machine embodying corn cob shredding rollers comprising the present invention.
Figure 2:
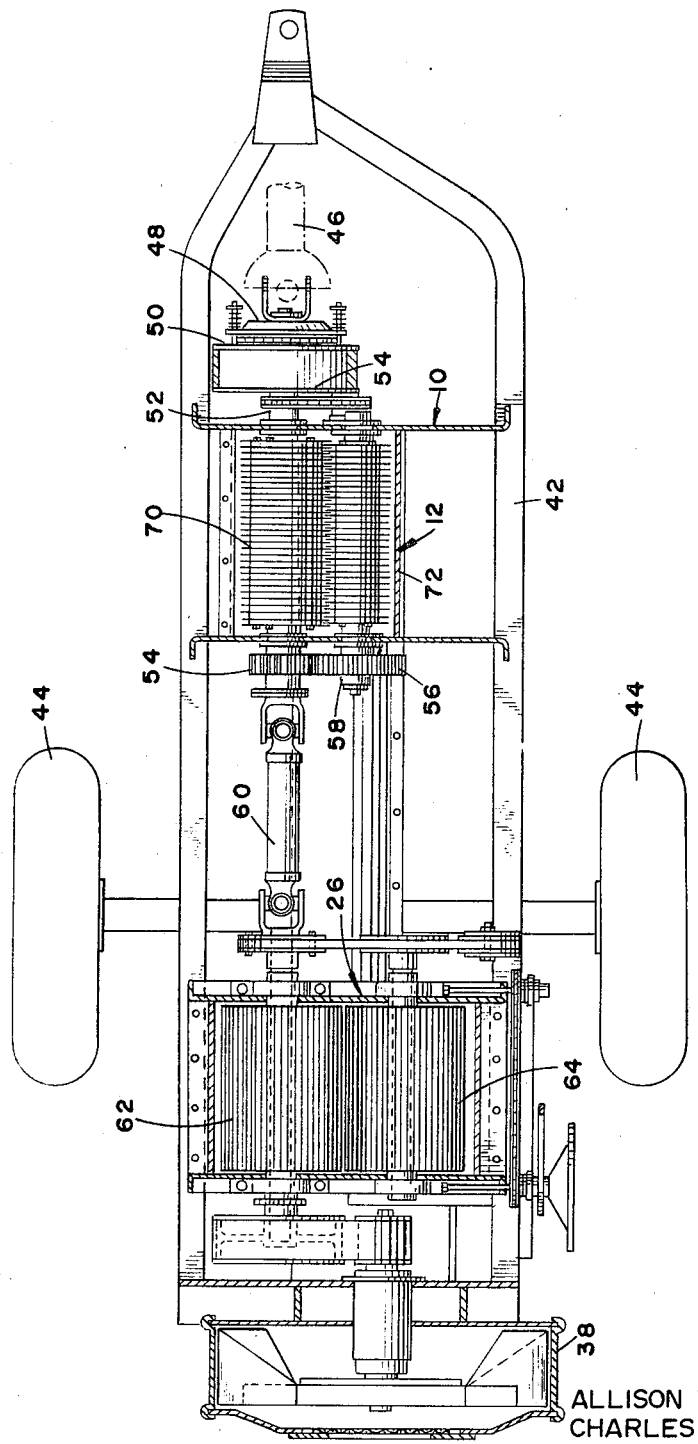
FIG. 2 is a horizontal sectional view taken on the line 2—2 of FIG. 1 and showing details of certain units of the overall corn processing machine shown in FIG. 1 and particularly showing a top plan view of the corn cob shredding rollers comprising the present invention.

Referring particularly to FIGS. 1 and 2, the overall processing machine comprising the subject matter of said co-pending application Ser. No. 546,280 is illustrated particularly in FIG. 1 for purposes of providing a basis for explaining the nature and function of the cob shredding mechanism comprising the essence of the present invention to which the appended claims are directed. Accordingly, the principal sections and units of the overall processing machine shown in FIG. 1 are briefly described as follows.

The entire machine is generally enclosed within a housing 10 which may be formed from suitable sheet metal, the upper portion of the housing extending horizontally and having downwardly extending conduit portions 12 and 14, which are substantially rectangular in cross-section, disposed adjacent opposite ends of housing 10. The conduits 12 and 14 likewise may be formed from similar material as the housing 10.

Ears of corn are delivered to the entrance means 16 by conveyor 18. Said ears are delivered to the interior of shelling screen 20 within which a toothed arbor 22 revolves for purposes of removing the kernels from the cobs and permitting the kernels to be discharged into upper screw conveyor 24 to insure movement of the shelled corn into the corn cracking unit 26, which cracks the kernels and discharges them into lower screw conveyor 28.

The bare cobs from which the kernels have been removed within the shelling screen 20 are progressively moved through said screen, toward the right as viewed in FIG. 1, into upper, cob chopping unit 30 in which radially projecting, longitudinally extending blades 32, which are supported on the right-hand end of arbor 22, for example, rotate around the axis of the arbor 22 in the direction of the arrow shown in FIG. 3 for purposes of effecting initial reduction in size of said cob. Depending upon the amount of cob material desired in the ultimate feed mixture comprising the product of the machine shown in FIGS. 1 and 2, either some, all, or none of the cob material may be discharged from the cob chopping unit 30 into the lower, cob shredding unit 34 comprising the principal part of the present invention.

Regulation of the amount of cob material which is discharged from chopping unit 30 into lower shredding unit 34 is effected by means of an adjustably positionable exit door 36, shown in FIGS. 1 and 3. In FIG. 3, the door is shown in fully opened condition, in which position substantially all of the coarse chopped cob product is discharged to the exterior of the machine. Conversely, when the door is closed to the dotted line position thereof shown in FIG. 3, all of the coarse chopped cob product will be discharged into the cob shredding unit 34.

The shredded cob product formed by unit 34 is discharged downwardly into lower screw conveyor 28 for movement of said product to the left as shown in FIG. 1, where it is intersected by the cracked corn product discharged downwardly from the cracking unit 26, substantially continuously, whereby appropriate intermixing of the cracked corn and shredded corn product is effected highly satisfactorily for delivery to a blower unit 38, from which the product is distributed through off-take conduit 40 to any desired means such as a storage bin, feed cart, or otherwise.

The entire processing machine shown in FIGS. 1-3 preferably is mounted upon an appropriate frame 42 which may be positioned either stationarily, such as in a processing shed, or the same may be portable, as by the use of suitable wheels 44, whereby the machine may be moved conveniently to any desired location of operation, such as adjacent a suitable feed bin, silo, or otherwise. Power is supplied, for example, from an appropriate source such as a tractor having a P.T.O. which operates a drive shaft 46 to drive an appropriate safety clutch 48 connected to drive sheave 50 on the outer end of shaft 52.

By means of appropriate sprocket gears and a chain 54 extending around the same as shown in FIGS. 1 and 2, the shaft 52 drives the auger of the lower conveyor 28. By means of a drive gear 54 on the opposite end of shaft 52 from sheave 50, driven gear 56 is rotated oppositely to said gear 54. Gear 56 is keyed or otherwise secured to driven shaft 58. Further, by means of an intermediate drive shaft 60 connected to shaft 52 beyond gear 54, the cracking rollers 62 and 64 of cracking unit 26 are driven rotatably toward each other. Further, by means of belt 66 which extends around sheave 50 and also around upper driven sheave 68 connected to the outer end of the shaft which supports arbor 22, the shelling unit within screen 20 is operated.

As indicated above, the present invention primarily concerns the lower cob shredding unit 34 which comprises a pair of inter-cooperating shredding rollers 70 and 72. The roller 70 is of appreciably larger diameter than the roller 72 and is mounted upon shaft 52, while shredding roller 72 is mounted upon shaft 58. Particularly from FIG. 2, it will be seen that the shafts 52 and 58 are parallel to each other and from FIG. 3, it will be seen that said shafts are both disposed substantially within a common horizontal plane.

The rollers 70 and 72 rotate toward each other at the upper portions thereof as indicated by the arrows shown in FIG. 3, whereby the same readily engage and shred either substantially whole corn cobs, from which the kernels have been removed, or partially chopped or broken pieces of corn cob. This is for purposes of relatively finely shredding the cob material into consumable size ranges appropriate for feeding to cattle and similar animals which normally consume substantially quantities of corn in the diet therefor.

In the prior art, it has been common practice to use corn cob processing and reducing rollers substantially of the same size and driven in opposite rotary directions at substantially the same speed. Various types of toothed blades have been used on such prior mechanisms, but the usual result has been that the cob material becomes meshed and lodged to a large extent between the teeth and the blades of the rollers, or otherwise the cobs are not suitably shredded or disintegrated. Rather, to a large extent, the cob material is simply somewhat crushed and mashed between said rollers.

In contrast to the prior devices of this type, the present invention employs the toothed shredding rollers 70 and 72 in a substantially different manner and, due to the construction of these respective rollers, a combined metering action for feeding the cob material to the sawing or cutting action performed upon the cob material occurs simultaneously and in a continuous, non-clogging manner which consumes no greater power than that employed in prior devices. These beneficial results are achieved by the following basic characteristics of the shredding roller 70, which primarily comprises a cutting or sawing roller, and the shredding roller 72, which primarily comprises a metering roller.

Referring particularly to FIGS. 4-8, it will be seen that the shaft 52 upon which cutting roller 70 is mounted has a section 74 thereon which is coextensive in length with the roller 70 and, in cross-section, is of a polygonal geometrical configuration specifically illustrated as a hexagon. The roller 70 is of a composite nature comprising a series of similar blades 76 each having a toothed periphery of which the teeth are substantially uniform in size and radial dimension.

The blades may be formed from suitably hardened tool steel upon which the teeth have been accurately ground and sharpened so as to be capable of efficient operation to saw and cut pieces of corn cobs into relatively finely divided shredded pieces of desired size ranges suitable for mixture with cracked corn to serve as cattle feed as aforesaid. The blades 76 have central openings 78 which are complementary in shape to the polygonal section 74 of shaft 52 so as to be keyed to said shaft for rotation thereby.

The blades 76 preferably are evenly spaced in an axial direction by appropriate circular spacing means comprising a series of short spacing tubes 80 which are accurately sawed from suitable tubular stock and the ends accurately ground to uniform length. They are very short compared to the diameter thereof. As readily seen from FIGS. 4 and 5, the outer diameter of the spacing rings or tubes 80 is slightly less than the diameter between the roots of the cutting teeth on the periphery of the blades 76. As best seen from FIG. 4, said spacing members provide only a limited depth between adjacent blades so as to minimize any tendency for material to become lodged or wedged between adjacent blades.

To secure the assembly of blades 76 and spacing members 80 in assembled relationship such as shown in FIG. 4, a plurality of parallel tie-bars 82 are utilized, these being received within suitable holes similarly formed in uniform patterns within the blades 76. As seen in FIG. 5 in particular, the tie-bars 82 are evenly circumferentially spaced around the axis of shaft 52, at even radial distances from said axis and substantially adjacent the inner surfaces of the spacing tubes or rings 80. Hence, when all of the blades and spacing tubes or rings are sequentially mounted with respect to each other upon the tie-bars 82, appropriate clamping nuts 84 are applied to the ends of said tie-bars to secure the assembly in operative position with respect to shaft 52.

Particularly by comparing blades 72 shown in FIG. 7 with respect to blades 70 shown in FIG. 5, wherein it will be seen that the blades 70 are of substantially greater diameter than the blades 72, it is preferred that additional spacing means be utilized in blades 70, the same being in the form of inner spacing rings 86 which are of smaller diameter than the outer spacing rings 80 and are concentric therewith and between the tie-bars 82 and the shaft 52. Hence, when the clamping nuts 84 are tightened into final position, there is little if any possibility of the outermost blades 76 being warped during such final tightening of the nuts 84 upon tie-bars 82, due particularly to the fact that the inner spacing rings 86 are precisely as thick as the outer spacing rings 80.

To maintain the inner spacing rings 86 substantially precisely concentric with respect to shaft 52 and the outer spacing rings 80, radial positioning means 88 are employed which, conveniently, may be in the form of arcuate members as best seen in FIG. 7. The shape and length thereof preferably are such that they not only fit between the concentric inner and outer rings 86 and 80 but also are positioned circumferentially preferably between adjacent pairs of the tie-bars 82.

The metering roller 72 is formed similarly to the sawing or cutting roller 70 in that said metering roller comprises a series of blades 90 which are all of similar shape and have teeth 92 on the periphery thereof which likewise are of similar shape to each other and are precisely formed such as by grinding, whereby the teeth are all of uniform radial dimension. These blades also are formed from appropriate tool steel or the like and are hardened for long wear.

As in regard to roller 70, the roller 72 also is provided with a plurality of accurately formed spacing tubes or rings 94 respectively between adjacent blades 90. The spacing rings 94 also are of the same exact length as the spacing rings 80 of roller 70, whereby as shown particularly in FIGS. 3 and 8, the distance transversely between the centers of the shafts 52 and 58 is such that the peripheral teeth of blades of one roller move within the spaces between the teeth of the blades of the other roller.

It is to be understood, however, that the rollers 70 and 72 may be adjusted by the machine being provided, for example, with a plurality of sets of spacing tubes or rings of different lengths but the tubes or rings of any one set all being of exactly the same length. For example, without restriction thereto, such tubes or rings of such sets of different lengths of rings may be in ranges of ¼", 5/16", ⅜", etc. In installing a set of spacing tubes or rings of a different size from those employed at any given time, it, of course, is necessary to disassemble both of the rollers 70 or 72 but the actual changing of the spacing tubes or rings under the circumstances is not greatly time-consuming and such changing is only seldom required under normal conditions of use, particularly after a desired size of shredded cob product is being obtained as a result of experimental testing of the machine with spacing rings of different sizes and a preferred size has been determined.

The blades 90 and spacing rings 94 of roller 72 are assembled and maintained in operative assembly by a series of tie-bars 96 having clamping nuts 98 threaded onto the outer ends thereof as clearly shown in FIGS. 6-8. The blades 90 all have similar circumferentially spaced holes positioned with identical radial dimensions from the axis of shaft 58 to receive the tie-bars 96. Said radial dimensions of said holes are such that the tie-bars 96 are adjacent the inner surfaces of the spacing rings 94 so as to concentrically position all of the same with respect to the axis of shaft 58.

Similarly to the blades of roller 70, the blades 90 of roller 72 also have central openings of polygonal geometric configuration which is complementary to that of the polygonal section 100 on shaft 58, which is coextensive in length with the roller 72, so as to key the blades 90 for rotation with shaft 58.

Particularly from FIGS. 5, 7 and 8, it will be seen that the teeth of the blades 76 of roller 70 are substantially smaller than the teeth 92 of blades 90 of metering roller 72. Further, from FIG. 2, and especially FIG. 8, it will be seen that the drive gear 54 is substantially smaller in diameter than the driven gear 56. Drive gear 54 is connected to shaft 52 upon which cutting roller 70 is mounted, while gear 56 is connected to shaft 58 upon which metering roller 72 is mounted. As a result, the metering roller 72, while being rotated at the upper portion thereof, as viewed in FIG. 3, for example, toward the upper portion of cutting roller 70 and the latter similarly is being rotated at the upper portion thereof toward the metering roller, the rotational speed of the metering roller 72 is substantially less than that of the cutting or sawing roller 70.

As a result of the foregoing arrangement, the metering roller 72, while moving at such slower rate, coupled with the fact that the teeth of the blades thereof are substantially larger than the teeth on the blades 76 of cutting roller 70, continually and progressively engages either whole corn cobs or large pieces of corn cob and forcefully moves the same into the space between the upper portions of the toothed rollers and this inescapably subjects the cob material to cutting and sawing action by the much more rapidly moving cutting blades 76 of roller 70. Such more rapid movement of the blades 76 likewise effects a clearing action with respect to the spaces between the blades 90 of metering roller 72 and, conversely, the teeth 92 of roller 72, even though moving more slowly than the teeth of the other roller, nevertheless progressively traverse the spaces between the blades 76 of more rapidly moving cutting roller 70, thereby continually clearing the same of any pieces of cob material which may have at least momentarily become lodged between adjacent blades.

From the foregoing, therefore, it will be seen that the cob shredding rollers comprising the essential feature of the present invention perform a dual function not heretofore provided in known cob shredding mechanism, the same comprising the forceful movement or feeding of corn cobs or large pieces thereof by the metering roller 72 at a desired rate into positive engagement with the more rapidly moving cutting teeth on the larger diameter blades of roller 70, thereby not only insuring rapid shredding and disintegration of the cobs into relatively uniform smaller size ranges, but also providing a self-clearing function for the spaces between the blades of the cooperating cutting and metering rollers 70 and 72.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. Corn cob shredding means for use in processing the same for mixture as an additive to cracked corn to increase the bulk and nutritive value as a cattle food, said shredding means comprising in combination, a pair of rollers comprisinging parallel shafts supported for rotation and circumferentially toothed blades evenly and similarly spaced on said shafts for support and rotation thereby, the teeth of the blades of one roller fitting into the spaces between the blades of the other roller, and drive means connected to said shafts to rotate the same in opposite rotary directions to cause the teeth of the blades of the rollers to move toward each other for engaging corn cobs therebetween to shred the same, the teeth of one roller being substantially larger than those on the other roller and said drive means being operable to drive the roller with the smaller teeth at a substantially higher rotary speed than the roller with the larger teeth, whereby the roller with the larger teeth serves as a metering roller to bring corn cobs into engagement with the smaller and more rapidly moving teeth of the other roller which operate to saw and shred the cobs while being positively fed thereto by the metering roller.

2. The corn cob shredding means according to claim 1 in which the blades on said one roller having larger teeth than those on the other roller are all of uniform diameter and the blades on said other metering roller which has larger teeth thereon also are of uniform diameter and said uniform diameter being substantially less than that of the diameter of the blades on said one roller.

3. The corn cob shredding means according to claim 1 further including short tube-like spacing rings of similar length between the blades of both rollers, the diameter of the rings on said rollers respectively being uniform on each roller but the diameter of the rings on the metering roller being smaller than the diameter of the rings on the other roller.

4. The corn cob shredding means according to claim 3 further including a plurality of axially extending, circumferentially spaced tie-bars extending through holes in the blades of said rollers and respectively being positioned adjacent the inner surfaces of the spacing rings of said rollers to position said spacing rings substantially coaxially with respect to the shafts of said rollers.

5. The corn cob shredding means according to claim 4 in which the shafts of said rollers have polygonal geometrical cross-sectional shapes and the blades on said rollers have holes in the centers thereof which are complementary in shape to the polygonal geometrical cross-sections of said shafts, thereby to key said blades relative to shaft shafts for rotation thereby.

6. The corn cob shredding means according to claim 4 further including additional spacing means between the two outermost blades at each end of the larger roller, said additional spacing means being positioned radially inwardly from the tie-bars and being operable to prevent warping of the endmost blades when said blades of the larger roller are tightened together against the spacing rings by said tie-bars.

7. The corn cob shredding means according to claim 6 in which said additional spacing means comprise short tube-like spacing rings of smaller diameter than the first-mentioned spacing rings but similar in length thereto and positioned coaxially therein, and further including centering means positioned at circumferentially spaced locations between said concentric rings to maintain the innermost spacing ring coaxially with the outermost spacing ring.

References Cited

UNITED STATES PATENTS

| | | | |
|---|---|---|---|
| 779,625 | 1/1905 | Scheetz. | |
| 1,042,932 | 10/1912 | Leonard | 146—71 |
| 1,994,137 | 3/1935 | Leguillon. | |
| 3,146,960 | 9/1964 | De Graff | 146—79 X |
| 3,151,645 | 10/1964 | Hesse | 146—71 |
| 3,348,780 | 10/1967 | Barkstrom et al. | 241—101 |

W. GRAYDON ABERCROMBIE, *Primary Examiner.*